United States Patent [19]

Jardinico, Jr.

[11] Patent Number: 4,934,421
[45] Date of Patent: Jun. 19, 1990

[54] WOOD CUTTING MACHINE

[75] Inventor: Robert E. Jardinico, Jr., Plymouth, Mass.

[73] Assignee: Colonial Saw Company, Inc., Kingston, Mass.

[21] Appl. No.: 387,763

[22] Filed: Aug. 1, 1989

[51] Int. Cl.⁵ .............................................. B27C 5/00
[52] U.S. Cl. ............................ 144/136 R; 83/468.6; 144/3 R; 144/3 A; 144/356; 144/368; 144/371; 269/315; 269/319; 409/203
[58] Field of Search ............... 269/315, 319; 83/468, 83/468.2, 468.6, 468.7; 409/203; 144/3 R, 3 A, 3 B, 3 C, 19, 136 R, 150, 367, 356, 368, 371

[56] References Cited

U.S. PATENT DOCUMENTS

| | | | |
|---|---|---|---|
| 3,238,980 | 3/1966 | Goldstein | 144/2 |
| 3,547,171 | 12/1970 | Jacumin | 144/325 |
| 4,132,253 | 1/1979 | Mills | 144/133 R |
| 4,632,165 | 12/1986 | Stegherr | 144/371 |
| 4,688,612 | 8/1987 | Kessel et al. | 144/3 R |
| 4,693,158 | 9/1987 | Price | 83/468 |
| 4,858,662 | 8/1989 | Bosten et al. | 144/136 C |

OTHER PUBLICATIONS

"Lamello Top", by Lamello (brochure).
"Lamello", by Lamello (brochure).
"Lamello 2000", by Lamello (brochure).

Primary Examiner—W. Donald Bray
Attorney, Agent, or Firm—Scott R. Foster

[57] ABSTRACT

A wood cutting machine having a first saw blade adapted to cut a horizontal groove in a wood member, a second saw blade adapted to cut a vertical groove in the wood member, motive means for moving the saw blades selectively into engagement with the wood member, and clamp means automatically operable before operation of the motive means for holding the wood member in place during a cutting operation.

10 Claims, 6 Drawing Sheets

WOOD CUTTING MACHINE

BACKGROUND OF THE INVENTION

1. Field of the Invention

The invention relates to wood cutting machines and is directed more particularly to a machine having circular saw blades for cutting grooves in wood members.

2. Description of the Prior Art

New methods of joining wood have been of interest to man for thousands of years. With the advent of hard steel tools, there were developed dove tail joints, finger joints, and dowelling, all of which have been time consuming and have required great skill to effect precisely and accurately.

In the 1950's, there was developed a wood joining system in which substantially matching grooves were cut in wood pieces to be joined. Splines, comprising thin, generally elliptically-shaped, wood wafers were slipped into the grooves of one of the wood pieces, and the grooves of the second of the wood pieces were then fitted upon the exposed portions of the splines to join the two pieces of wood which were held together by the splines. A cement was commonly introduced into the grooves during assembly to further strengthen the bond. The splines preferably were made of wood, such as kiln-dried, biased-cut, compressed Beechwood, that expanded as it absorbed the cement and solidly bonded together the two pieces of wood.

To cut the required grooves in the wood pieces to be joined together, there have been developed hand-held cutting tools which are capable of cutting a groove in the edge portion of a wood board, or in the major surfaces of the board. Typically, particularly in cabinet making, it is desired to join the edge of one board, such as a shelf, to a major surface of another board, such as a side of a cabinet. Such cabinet making techniques have become known as "frameless cabinetry", that is, the production of a cabinet having only the major components, such as sides, shelves, front, back, and top, joined together directly rather than attached to a supporting frame.

The required grooves are cut with a circular saw blade and, as noted above, the splines are generally elliptical in configuration, providing some flexibility in aligning the joined parts after they have been joined. Of course, such final positioning must be accomplished shortly after joining, before the cement has set and/or before the splines have expanded. The final positioning feature helps eliminate the need for sanding and planing, and therefore decreases time required for assembly.

The above-described system facilitates the quick and easy assembly of components by way of face joints, butt joints, edge joints, mitre joints and compound joints, each joint perfect and strong.

In an alternative embodiment, the above system may be practiced using metal fittings in place of the wood splines. The fittings may be configured such that the fittings disposed in the grooves of a first wood member interlock with the fittings disposed in the grooves of a second wood member. The fittings may be secured in the grooves by an epoxy cement, or the like.

Whether using wood splines or metal fittings, the required grooves are identical and are cut by circular saw blades which, in practice, usually are mounted in hand-held tools.

In a production environment in which large numbers of a wood product are to be made, it would be beneficial to have an inexpensive bench-type work station in which horizontal and vertical cuts could be made in wood members to be joined at a subsequent work station.

SUMMARY OF THE INVENTION

It is therefore an object of the present invention to provide a machine for quickly and easily cutting such grooves in wood members.

A further object is to provide such a machine of relatively simple and inexpensive construction.

A still further object is to provide such a machine as is safe to operate, requires little training of operators, and requires no additional equipment to be operationally ready for running.

With the above and other objects, as will hereinafter appear, a feature of the present invention is the provision of a wood cutting machine comprising a frame, a flat surface supported by said frame and adapted to receive a wood member thereon, a first circular saw blade mounted on the machine and adapted to cut a horizontal groove in the wood member, a second circular saw blade mounted on the machine and adapted to cut a vertical groove in the wood member, first motive means for moving the first saw blade into cutting engagement with the wood member, second motive means for moving the second circular saw blade into cutting engagement with the wood member, electrical means for activating cutting motion of the first and second circular saw blades, switch means for selectively activating one of the first and second motive means, clamp means mounted on the machine and operable to clamp the wood member on the flat surface, and an actuating switch operable to cause operation of the clamp means and, thereafter, operation of the activated one of the first and second motive means.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent. In the drawings.

DESCRIPTION OF A PREFERRED EMBODIMENT

Figure 1:
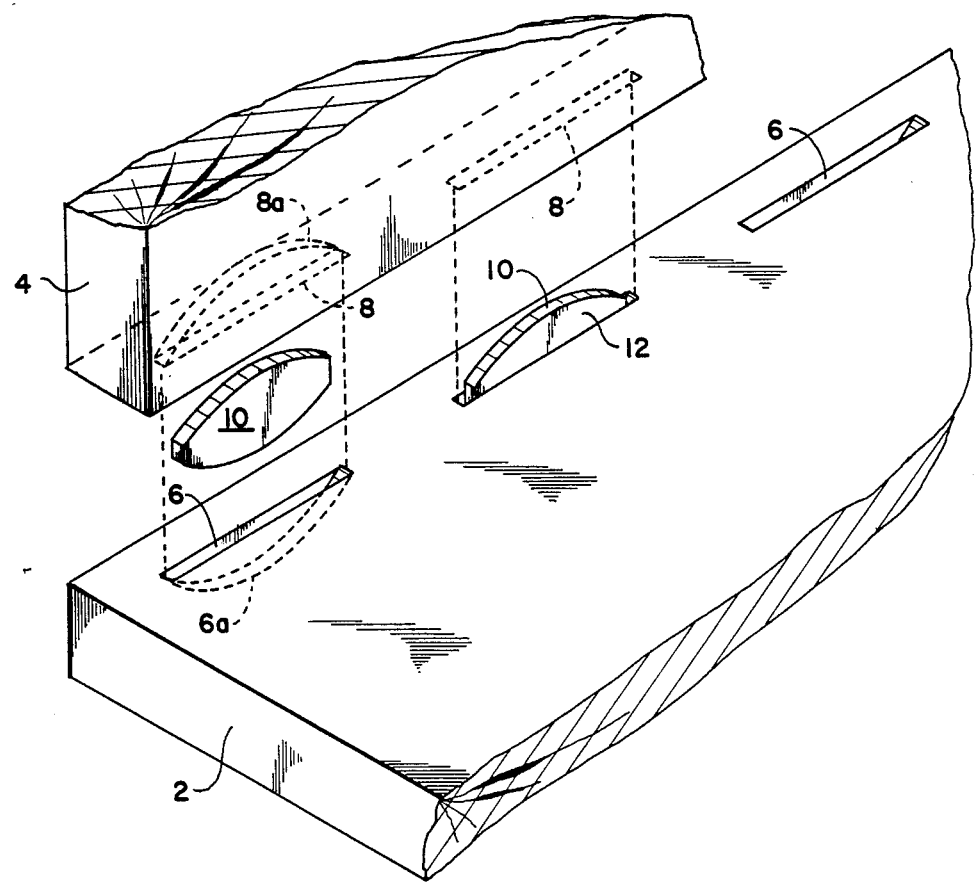
FIG. 1 is a perspective view of the two wood members to be joined, illustrating the use to which the grooves cut by the invention herein are put.
Figure 2A:
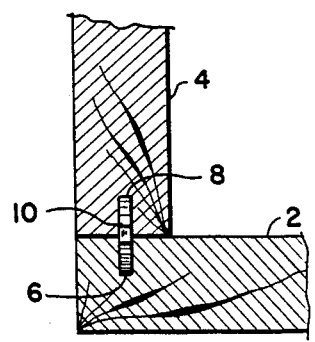
FIGS. 2A and 2B are sectional views illustrating the joining together of two wood members.
Figure 2B:
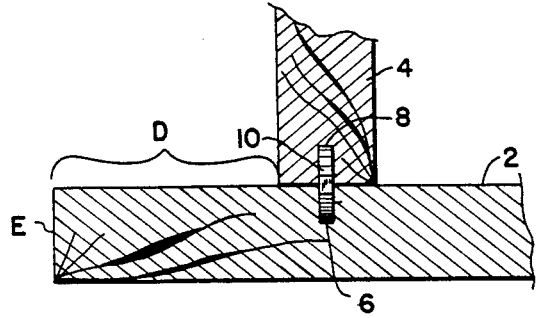
Figure 3:
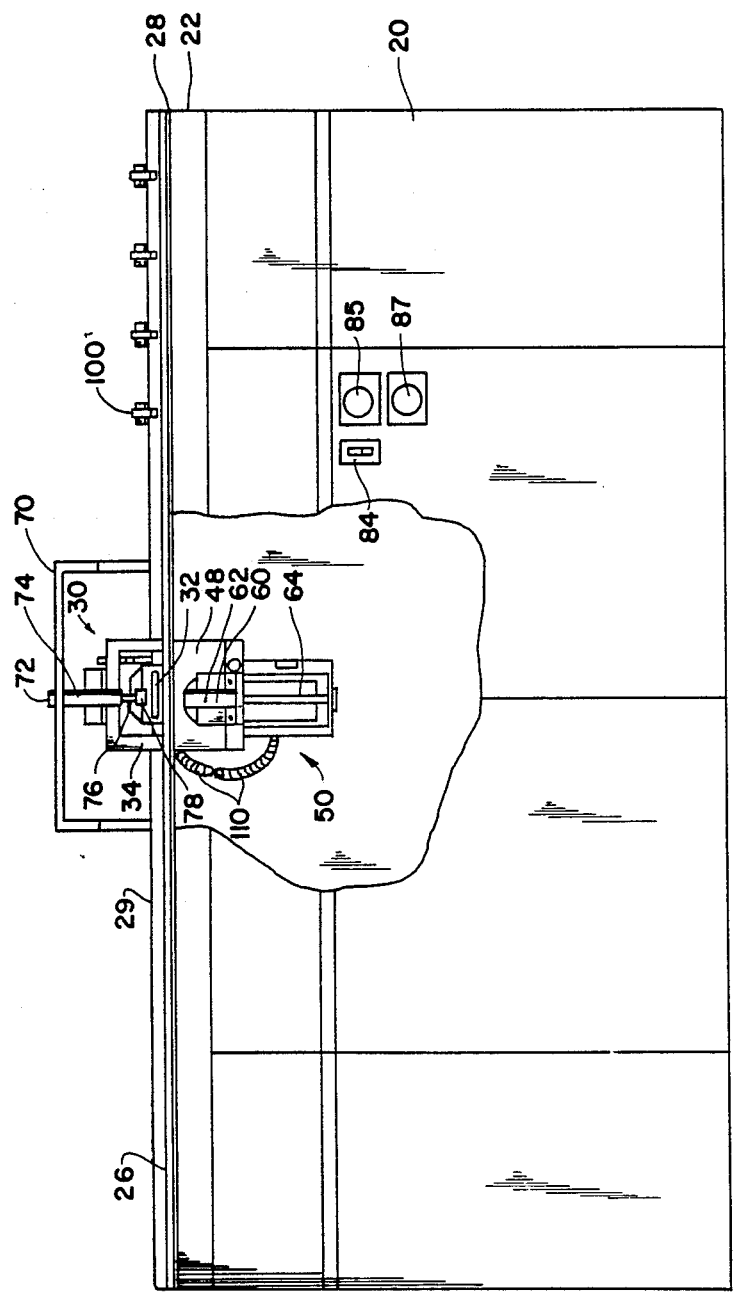
FIG. 3 is a front elevational view of a wood cutting machine illustrative of an embodiment of the invention.
Figure 4:
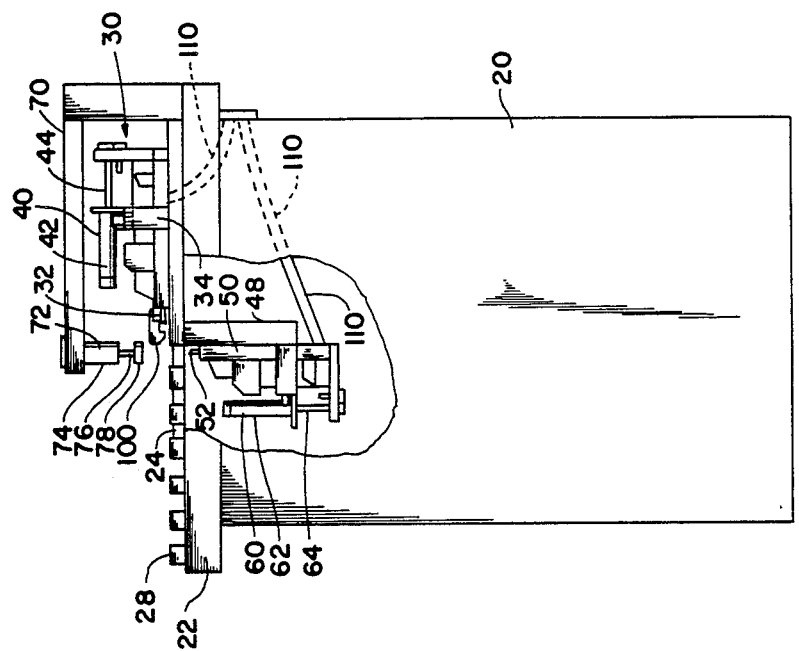
FIG. 4 is an end elevational view of the machine of FIG. 3.
Figure 5:
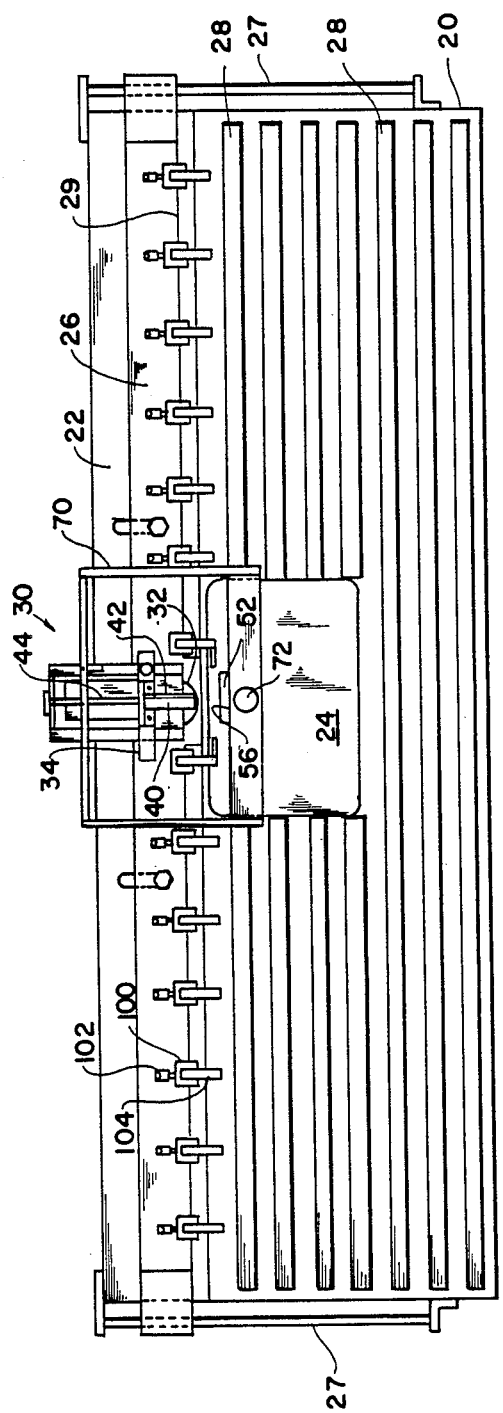
FIG. 5 is a top plan view of the machine of FIGS. 3 and 4.
Figure 6:
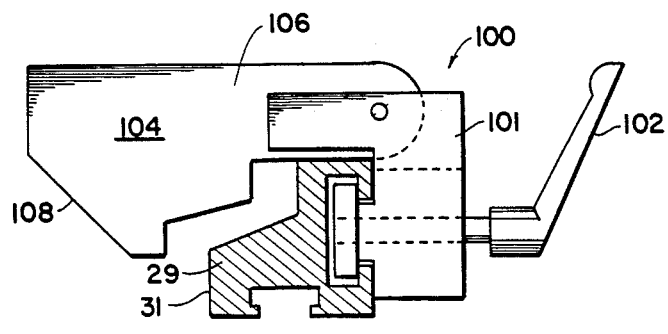
FIG. 6 is a side elevational view of one component of the machine.
Figure 7:
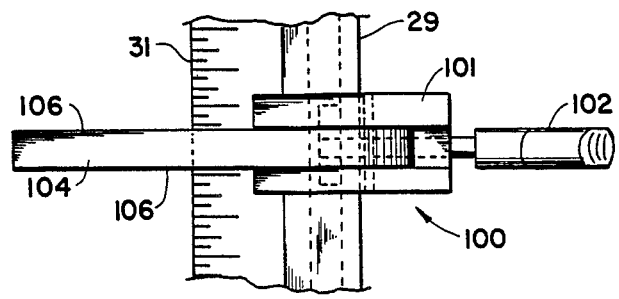
FIG. 7 is a top view of the component shown in FIG. 6.

Referring to the drawings, particularly FIGS. 1, 2A and 2B, there will now be described the method of joining wood members, giving rise to the need of a machine having the features and capabilities of the present invention.

To a horizontal wood member 2 there may be affixed a vertical wood member 4 for purposes of constructing a frameless cabinet, or the like. The horizontal wood member 2 is provided with a series of grooves 6 cut with a circular saw blade so as to provide a circular groove as illustrated in phantom at 6a in FIG. 1. In like manner, the vertical wood member 4 is provided with a series of grooves 8, adapted to be opposed to the grooves 6, and also of a circular configuration, as illustrated at 8a in FIG. 1. To join the wood members 2, 4, splines 10 are inserted in the grooves 6, which preferably previously have had liquid cement placed therein. The grooves 8, with liquid cement therein, are then fitted over the exposed portions 12 (FIG. 1) of the splines 10 to join the wood members 2, 4 together (FIGS. 2A and 2B). As noted above, the cement has a two-fold effect in (1) cementing the wood members together and (2) causing the splines 10 to expand to more securely join the wood members.

Referring to FIGS. 3-8, there will now be described an illustrative machine for effecting cutting of the circular grooves required in the above-described method of assembly.

The illustrative machine comprises a frame and/or housing 20 supporting a work top 22 on which are fixed a throat plate 24, and a plurality of wear plates 28. The throat plate 24 is adapted to receive thereon the wood members for cutting circular grooves therein. A base plate 26 is mounted on rails 27 fixed to each end of the machine (shown in FIG. 5 only) and is movable on the rails 27 forwardly and rearwardly. Locking means (not shown) are provided for locking the base plate 27 in a selected location. A fence means 29 is mounted on the base plate 26.

Mounted on the base plate 26 is a horizontal saw unit comprising a first saw power head 30 having a circular saw blade 32 adapted to cut horizontal grooves 8 (FIG. 1) in a wood member. Mounted on a bracket 34 fixed to the base plate 26 is a first motive means 40 for moving the first saw power head saw blade 32 into engagement with the wood member. The first circular saw blade 32 is mounted on a vertical axis in the power head 30, such that the first circular saw blade 32 is disposed in a substantially horizontal plane, i.e., a plane substantially parallel to the flat surface of the throat plate 24. The first motive means 40 comprises means for moving the first circular saw blade 32 into engagement with the wood member and preferably comprises a first pneumatic cylinder and piston assembly 42 mounted on the bracket 34 and having a piston rod 44 extending therefrom. The cylinder of the assembly 42 is connected to the first saw power head 30 and operable to move the first saw power head 30, and thereby the first circular saw blade 32, forwardly and rearwardly. There is also provided electrical means 46 for activating the rotary cutting motion of the first circular saw blade 32. Thus, upon actuation of the first motive means 40, the first circular saw blade 32 is moved forwardly to engage the wood member with the blade 32 rotating to cut a groove in the wood member.

Mounted in the housing 20, beneath the throat plate 24 on a bracket 48 (FIG. 4), is a vertical saw unit comprising a second saw power head 50 having a second circular saw blade 52 adapted to cut vertical grooves 6 (FIG. 1) in a wood member. The second circular saw blade 52 is disposed in an opening in the work top 22 and beneath a slot 56 (FIG. 5) in the throat plate 24. Also mounted on the bracket 48 is a second motive means 60 for moving the second power head circular saw blade 52 into engagement with the wood member. The second circular saw blade 52 is mounted on a horizontal axis in the power head 50, such that the second circular saw blade 52 is disposed in a substantially vertical plane, i.e., a plane substantially normal to the flat surface of the throat plate 24. The second motive means 60 comprises means for moving the second circular saw blade 52 into engagement with the wood member, and preferably comprises a second pneumatic cylinder and piston assembly 62 mounted on the bracket 48 and having a piston rod 64 extending therefrom. The cylinder of the assembly 62 is connected to the second saw power head 50 and operable to move the second saw power head 50, and thereby the second circular saw blade 52, vertically upwardly and downwardly. There is also provided electrical means 66 for activating the rotary cutting motion of the second circular saw blade 52. Thus, upon actuation of the second motive means 60, the second circular saw blade 52 is moved upwardly through the slot 56 to engage the wood member with the blade 52 rotating to cut a groove in the wood member.

Mounted on a frame member 70 disposed over the throat plate 24 is a clamp means 72 comprising a pneumatic clamp cylinder and piston assembly 74 having extending therefrom a piston rod 76 having fixed to the free end thereof a clamp foot 78. The clamp foot 78 is adapted to engage a wood member disposed on the throat plate 24 prior to a groove cutting operation and securely clamp the wood member between the foot 78 and the throat plate 24, such that the wood member will remain immobile during a cutting operation. As will be further described below, the clamp means 72 automatically operates before the motive means 40, 60, such that the wood member is securely anchored in place before and during cutting.

Figure 8:
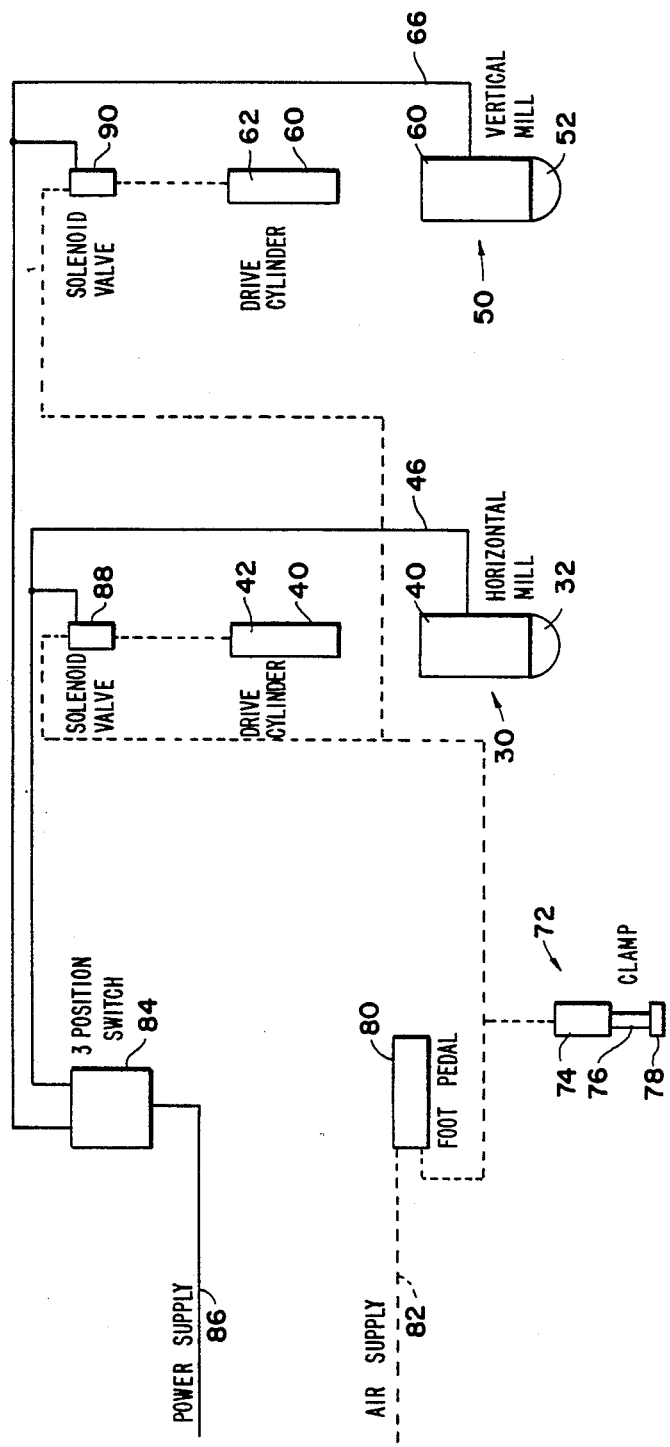
FIG. 8 is a diagrammatic representation of an electrical and pneumatic circuit suitable for use in the machine.

The actuation of the motive means 40, 60 and the clamp means 72 is accomplished by means of a foot-operated clamp and motive means activating switch 80, shown diagrammatically in FIG. 8. Foot operation of the clamp and motive means actuating switch 80 enables an operator to devote both hands to properly orienting the wood members to be cut. The foot-operated switch 80 is connected to an air supply line 82.

Disposed on the housing 20 is a three-way electrical switch 84 by which the machine is connected to an electrical power line 86. In a first position, the switch 84 is "off" and stops electrical power from travel beyond the switch into the machine. In a second position, the switch 84 activates rotation of the first circular saw blade 32 and permits electrical power to be transmitted to a first solenoid valve 88 which in turn serves to permit operation of the first cylinder and piston assembly 42. In the second position, the switch 84 prevents operation of the second circular saw blade 52 and prevents operation of a second solenoid valve 90 and therefore prevents operation of the second cylinder and piston assembly 62. In a third position, the switch 84 activates rotation of the second circular saw blade 52 and permits electrical power to be transmitted to the second solenoid valve 90 which in turn serves to permit operation of the second cylinder and piston assembly 62. In the third position, the switch 84 prevents operation of the blade 32 and prevents operation of the first solenoid valve 88, and therefore prevents operation of the first cylinder and piston assembly 62. In short, the switch 84 may be used to select (1) off, (2) horizontal groove cutting, or (3) vertical groove cutting.

Near the switch 84, there may be disposed a pair of signal lights 85, 87 (FIG. 3), the former, 85, being actuated when the switch 84 is in the second position and the latter, 87, being actuated when the switch 84 is in the third position. Neither light is actuated when the switch 84 is in the "off" position.

When the switch 84 is in position (2) or (3), depression of the foot-operated actuating switch 80 causes immediate operation of the pneumatic clamp cylinder and piston assembly 74 to clamp the wood member in place. The pneumatic pressure then operates whichever solenoid valve (88 or 90) has been selected at the electrical switch 84. The electrically activated solenoid will, after actuation of the clamp cylinder 75, permit passage of pneumatic pressure therethrough to effect operation of the previously activated circular saw blade motive means, 40 or 60, to effect a horizontal or vertical cut in the wood member.

Mounted on the fence means 29 are a number of work stop assemblies 100. The stop assemblies 100 are for the purpose of locating wood members on the machine in an appropriate place for each cutting operation, to insure accurate placing of the grooves. Each stop assembly 100 includes a base member 101 slidably mounted on the fence means 29, a locking handle 102 which may be tightened to hold the base member 101 in a selected location along the length of the fence means, or loosened for movement of the stop assembly. The stop assemblies 100 may be repositioned on the fence means 29 by sliding of the stop assembly along the fence means. Each stop assembly includes an arm 104 pivotally mounted on the base member 101 and which may be pivoted upwardly and rearwardly to an out-of-the-way position, or forwardly to a wood member engaging position.

The sides 106 of the stop assembly arms 104 are planar (FIG. 7) and therefore the arms 104 hold their position when a wood member is butted against a st:p assembly from the side. The front of each arm 104 is provided with an inclined surface 108 (FIG. 6), such that the arms 104 will pivot upwardly and slide over the top of a wood member if approached from the front. Accordingly, an operator may make cuts using the stop assemblies 100 consecutively, without having to move each succeeding stop arm 104 out of the way.

Dust collection tubes 110 are provided near the first and second saw blades 32, 52. The tubes 110 may be attached to a central dust extraction unit (not shown).

In operation, the electrical power line 86 of the machine is connected to a 110 volt, 20 amp outlet and the air line 82 is connected to an air pressure source of preferably around 75 p.s.i. The dust collection system is energized. The base plate 26 and the stop assemblies 100 are moved to the desired locations for the particular job at hand and locked into place. A wood member is placed upon the throat plate and urged into contact with the fence means 29 and an appropriate stop assembly arm 104. The three-way electrical switch is then turned from the "off" position to, for example, the second position, for effecting the cutting of horizontal grooves in the wood member. The first circular saw blade 32 is thereby activated and rotates at cutting speed, though still in a retracted position.

The operator then depresses the foot-operated actuating switch 80, while using both hands to control the position of the wood member. Upon operation of the switch 80, the clamp cylinder and piston assembly 74 causes the clamp foot 78 to press the wood member against the throat plate 24 to securely hold the wood member in place. Thereafter, the first cylinder and piston assembly 42 operates to move the activated first circular saw blade 32 into engagement with the wood member to effect groove cutting therein. Upon completion of the cutting operation, the first cylinder and piston assembly 42 automatically operates to withdraw the first circular saw blade 32 from the wood member and return the blade to its inactive position. Upon release of the foot actuated switch 80, the clamp cylinder and piston assembly 74 operates to withdraw the clamp foot 78 from the wood member.

The operator then continues positioning the wood member for further horizontal grooving operations and repeats the procedure outlined above. Upon completion of the horizontal grooving operation, the operator typically undertakes vertical grooving and places a wood member on the throat plate 24. The three-way switch 84 is moved to the third position to activate the second circular saw blade 52, and the foot operated switch 80 again depressed, causing operation of the clamp cylinder and piston assembly 74, as before, and this time causing operation of the second cylinder and piston assembly 62 to effect movement of the second circular saw blade 52 vertically into cutting engagement with the wood member, to effect a vertical grooving operation. Upon completion of the cutting operation, the second cylinder and piston assembly 62 operates to withdraw the second circular saw blade 52. Again, upon release of the foot operated switch 80, the clamp foot 78 is withdrawn by the clamp cylinder and piston assembly 74 from engagement with the wood member. The process is continued, as above described, until all grooves have been cut.

The spatial relationship between the two circular saw blades 32, 52 is critical. Wood members are placed on the machine and inserted into the machine with a major surface flat on the throat plate 24. Accordingly, grooves cut by the second saw blade 52, that is, the vertical saw unit, are cut in a major surface, or face, of the wood member (grooves 6 in FIG. 1). Grooves cut by the first saw blade 32, that is, horizontal saw unit, are cut in an edge portion of the wood member (grooves 8 in FIG. 1). As long as the distance between the frontmost surface 31 of the fence means 29 (FIG. 6) and the second circular saw blade 52 in its advanced position is equal to the distance between the surface of the throat plate 24 and the first circular saw blade 32 in its advanced position, grooves 6, 8 cut by the two circular saw blades 32, 52 will match, as shown in FIGS. 1 and 1A, with the wood member 2 having been cut by the vertical unit and the wood member 4 having been cut by the horizontal unit. The distances, as described above, must be equal. If not, the edge of the wood member 2 will not be properly aligned with the outside surface of the wood member 4.

The above-described spatial relationship may be varied under certain conditions, as, for example, when it is desired to assemble a cabinet with a stretcher located below the top drawer, or other such arrangement requiring an assembly of wood members as illustrated in FIG. 2B. In such a case, the operator may unlock the base plate 24, slide the base plate 24 rearwardly on the rails 27 to a desired offset, and lock the base plate in place. Inasmuch as the fence means 29 is mounted on the base plate 24, the repositioning of the base plate results in changing the distance between the second circular saw blade 52, or vertical saw and the fence. The distance between the first circular saw blade 32, or horizontal saw, and the throat plate remain unchanged. Such an arrangement results in the grooves 6 (FIG. 2B) being removed from the edge E of the wood member 2 by a distance D.

The machine is provided with stop means (not shown) so that upon completion of the above operation, the base plate may be slid forwardly into engagement with the stop means, at which point the original relationship is reestablished.

It is to be understood that the present invention is by no means limited to the particular construction herein disclosed, but also comprises any modifications or equivalents within the scope of the disclosure.

Having thus described my invention, what I claim as new and desire to secure by Letters Patent of the United States is:

1. A wood cutting machine comprising a frame, a flat surface supported by said frame and adapted to receive a wood member thereon, a first saw means mounted on said machine and adapted to cut a horizontal groove in said wood member, a second saw means mounted on said machine and adapted to cut a vertical groove in said wood member, first motive means for moving said first saw means into engagement with said wood member and first electrical means for activating cutting motion of said first saw means, second motive means for moving said second saw means into engagement with said wood member, and second electrical means for actuating cutting motion of said second saw means, electrical switch means for selectively activating one of said first and second motive means and one of said first and second electrical means, clamp means mounted on said machine and operable to clamp said wood member on said surface, and an actuating switch operable to cause operation of said clamp means, and, thereafter, operation of the activated one of said first and second motive means.

2. The wood cutting machine in accordance with claim 1, in which said first and second saw means comprise first and second circular saw blades, respectively.

3. The wood cutting machine in accordance with claim 2, in which said first motive means comprises a first fluid operated cylinder and piston assembly adapted to move said first circular saw blade into engagement with said wood member, and said second motive means comprises a second fluid operated cylinder and piston assembly adapted to move said second circular saw blade into engagement with said wood member.

4. The wood cutting machine in accordance with claim 3, in which said clamping means comprises a clamp foot mounted on the free end of a piston rod fixed to a piston disposed in a third fluid operated cylinder.

5. The wood cutting machine in accordance with claim 4, in which said actuating switch is a foot-operated switch and said electrical switch means comprises an electrical selector switch for selectively determining whether said first motive means or said second motive means is in operative communication with said foot-operated switch.

6. The wood cutting machine in accordance with claim 5 and further comprising fence means proximate said flat surface and upstanding normal to said flat surface, and stop assemblies mounted on the fence means and slidably moveable on said fence means, locking means being disposed on each of said stop assemblies for locking said stop assemblies in selected locations on said fence means.

7. The wood cutting machine in accordance with claim 6 in which each of said stop assemblies is provided with a pivotally mounted arm adapted to be pivoted to a first position in which the arm may be engaged by said wood member to facilitate positioning of said wood member, and to a second position in which said arm is disposed in an out-of-the-way position in which said arm is removed from positioning engagement with said wood member.

8. The wood cutting machine in accordance with claim 7 in which said arm is provided with an inclined surface adapted to be engaged by a wood member edge and to facilitate pivotal movement of said arm to said second position, and said arm is provided with a planar side surface which remains immovable by contact with a wood member edge.

9. A wood cutting machine comprising a frame, a throat plate supported by the frame and adapted to receive a wood member thereon, a horizontal saw unit mounted on said machine and adapted to cut a horizontal groove in said wood member, said horizontal saw unit including a horizontal circular saw blade, a vertical saw unit mounted on said machine and adapted to cut a vertical groove in said wood member, said vertical saw unit including a vertical circular saw blade, a base plate mounted on said machine and having mounted thereon fence means upstanding from said base plate and substantially normal to said throat plate, a first distance between a frontmost surface of said fence means and said vertical circular saw blade being equal to a second distance between said throat plate and said horizontal circular saw blade.

10. The wood cutting machine in accordance with claim 9 including means for selectively varying said first distance.

* * * * *